US006756980B2

(12) United States Patent
Hayashi

(10) Patent No.: US 6,756,980 B2
(45) Date of Patent: Jun. 29, 2004

(54) IMAGING SIMULATION METHOD AND IMAGING SIMULATION SYSTEM USING THE SAME AND RECORDING MEDIUM PROGRAMMED WITH THE SIMULATION METHOD

(75) Inventor: Shinichi Hayashi, Tokyo (JP)

(73) Assignee: Olympus Corporation, Tokyo (JP)

( * ) Notice: Subject to any disclaimer, the term of this patent is extended or adjusted under 35 U.S.C. 154(b) by 362 days.

(21) Appl. No.: 10/026,657

(22) Filed: Dec. 27, 2001

(65) Prior Publication Data

US 2002/0113790 A1 Aug. 22, 2002

(30) Foreign Application Priority Data

Dec. 27, 2000 (JP) ........................................ 2000-396780

(51) Int. Cl.[7] .............................................. G06T 15/00
(52) U.S. Cl. ..................................................... 345/426
(58) Field of Search ................................ 345/419, 426, 345/427; 702/57, 65, 66, 71, 73; 706/920, 932; 367/38, 50

(56) References Cited

U.S. PATENT DOCUMENTS 5,677,893 A * 10/1997 de Hoop et al. ............... 367/50
5,852,588 A * 12/1998 de Hoop et al. ............... 367/38
6,226,599 B1    5/2001 Namiki ......................... 702/57

FOREIGN PATENT DOCUMENTS

| JP | 6-215084 | 8/1994 |
| JP | 7-37769 | 2/1995 |
| JP | 9-089720 | 4/1997 |

OTHER PUBLICATIONS

Born et al., "Principles of Optics: Electromagnetic Theory of Propagation, Interference and Diffraction of Light," Sixth Edition (1980), Pergamon Press, pp. 370–387.

Wojcik et al., "Numerical Simulation of Thick Line Width Measurements by Reflected Light," SPIE 1991 Symposium on Microlithography, vol. 1464, pp. 1–20.

Ito, "Optics for Steppers (1)", Optical Technology Contact, vol. 27, No. 12, (1989), pp. 762–771.

Ito, "Optics for Steppers (2)", Optical Technology Contact, vol. 28, No. 1, (1990), pp. 59–67.

Ito, "Optics for Steppers (3)", Optical Technology Contact, vol. 28, No. 2, (1990), pp. 108–119.

Ito, "Optics for Steppers (4)", Optical Technology Contact, vol. 28, No. 3, (1990), pp. 165–175.

Wojcik et al., "Some Image Modeling Issues for I–line, 5x phase Shifting Masks," 1994 SPIE optical/laser Microlithography VII Proceedings, pp. 455–465.

Richards et al., "electromagnetic Diffraction in Optical Systems: Structure of Image Field in an Aplanatic System," Feb. 19, 1959, pp. 358–379.

* cited by examiner

Primary Examiner—Phu K. Nguyen
(74) Attorney, Agent, or Firm—Pillsbury Winthrop LLP

(57) ABSTRACT

The present invention relates to a method capable of accurate imaging simulation even when the NA of illuminating light is large, or when the object under observation is not conformable to the 2.5-dimensional configuration, or when an image-forming optical system is focused to the inside of the object, and also relates to a system using the method. The imaging simulation method has a first step of calculating the electric field distribution of illuminating light entering a three-dimensional space containing an observation object, a second step of calculating the electric field distribution in the three-dimensional space of scattered light generated by interaction between the illuminating light and the observation object, and a third step of calculating imaging of the scattered light performed by an image-forming optical system by using the Helmholtz-Kirchhoff integral using a characteristic Green's function group of the image-forming optical system.

20 Claims, 12 Drawing Sheets

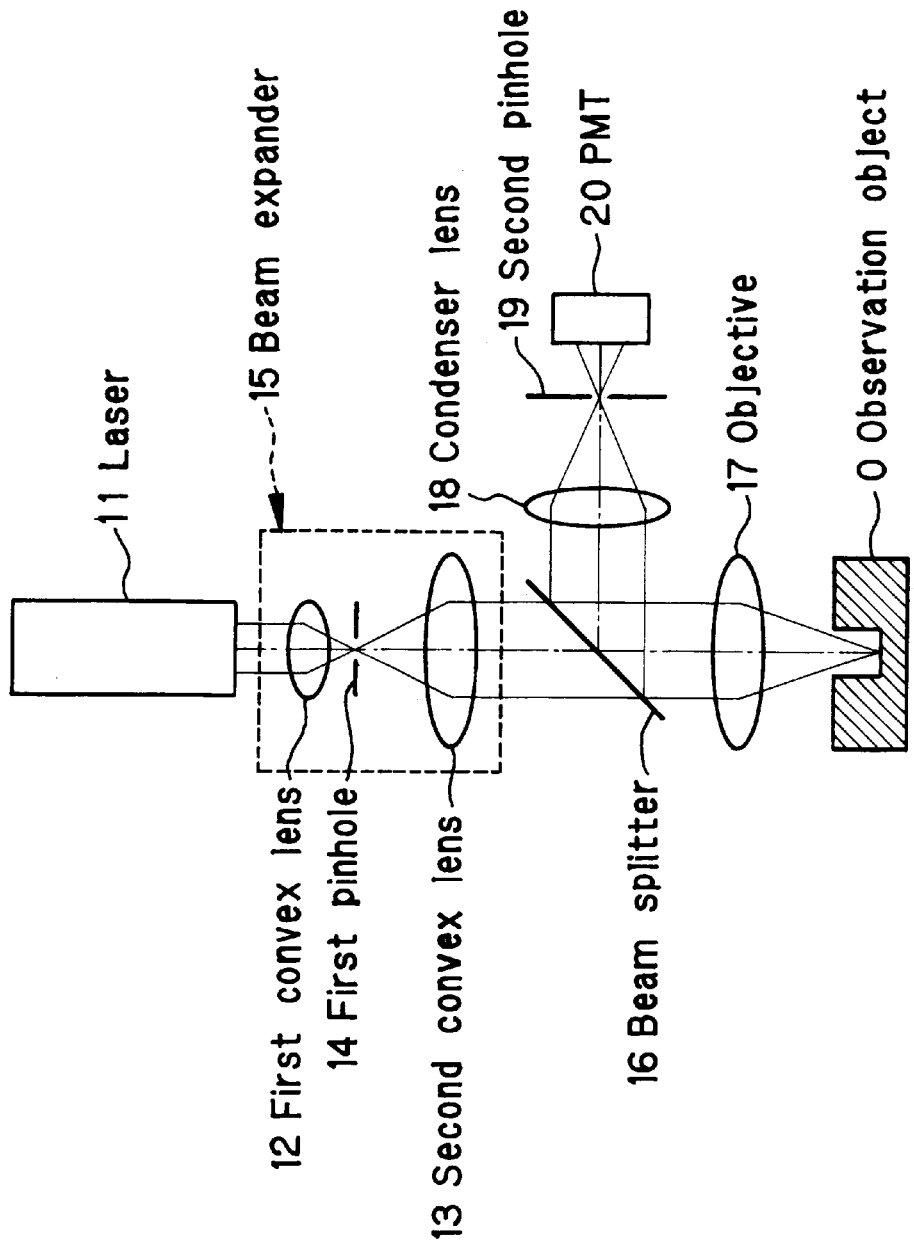

Three-dimensional electromagnetic field calculation domain

Three-dimensional electromagnetic field calculation domain

Three-dimensional space
surrounding object

Cell

IMAGING SIMULATION METHOD AND IMAGING SIMULATION SYSTEM USING THE SAME AND RECORDING MEDIUM PROGRAMMED WITH THE SIMULATION METHOD

This application claims benefit of Japanese Application No. 2000-396780 filed in Japan on Dec. 27, 2000, the contents of which are incorporated by this reference.

BACKGROUND OF THE INVENTION

1. Field of the Invention

The present invention relates to an imaging simulation method and an imaging simulation system using the same, and also relates to a recording medium programmed with the imaging simulation method. More particularly, the present invention relates to a method of simulating imaging of an observation object performed by an image-forming optical system, and also relates to a simulation system using the imaging simulation method. Further, the present invention relates to a recording medium containing an imaging simulation program for instructing a computer to execute the imaging simulation method.

2. Discussion of Related Art

As methods of calculating imaging, including illuminating light, in microscopes, steppers, etc., those based on imaging theory according to Fourier optics are publicly known as shown, for example, in M. Born and E. Wolf, "Principles of Optics, Sixth Edition", Pergamon Press (1980), Chapter X, and Tokuhisa Ito, "Optics for Steppers (1) to (4)", Optical Technology Contact, Vol. 27 (1989), pp. 762–771, and Vol. 28 (1990), pp. 59–67, 108–119, and 165–175. For example, Köhler illumination employed most frequently in microscopes and steppers uses an imaging system as shown in FIG. 12. As illustrated in the figure, the imaging system comprises an illuminating optical system including an effective source, an object, an image-forming optical system, and an image plane. The effective source is placed at the position of the pupil of the illuminating optical system or at a position conjugate to the pupil position. The pupil position of the illuminating optical system is conjugate to the pupil position of the image-forming optical system. The object position and the image plane are also conjugate to each other. In imaging calculation based on Fourier optics, the image intensity distribution I in the image plane is calculated from the following equation on the assumption that the intensity distribution S of the effective source, the transmission function a of the object and the pupil function P of the image-forming optical system can be expressed in terms of spatially two-dimensional scalar functions:

$$I(v) = \int\int {}^F S(u_1 - u_2) a(u_1) a^*(u_2) \times {}^F P(v - u_1) {}^F P^*(v - u_2) du_1 du_2 \quad (1)$$

where $u_1$ and $u_2$ are position coordinates in the object plane; $v$ is a position coordinate in the image plane; and ${}^F S$ and ${}^F P$ represent the Fourier transform of S and the Fourier transform of P, respectively.

Thus, in the imaging calculation based on Fourier optics, the image intensity distribution can be obtained by a simple integration using a Fourier transform of a scalar function determined by each constituent element of the optical system and the transmission function of the object. Further, this theory is convenient for the discussion of the spatial frequency characteristics of imaging. Therefore, it is widely used as imaging theory for microscopes, steppers, etc.

With the imaging calculation method based on Fourier optics, however, the object is expressed as a spatially two-dimensional scalar function. Therefore, it is impossible to accurately express the imaging of an object having a three-dimensional structure for which the thickness cannot be ignored. That is, an object with a thickness varies in transmittance according not only to the position where light rays pass but also to the inclination of the rays.

Under these circumstances, attempts have been made to perform imaging calculation for microscopes, steppers, etc. by a method wherein only the surrounding of the object is subjected to the electric field calculation in the three-dimensional space containing the object, and the remaining part is subjected to the conventional imaging calculation based on Fourier optics, as stated, for example, in G. L. Wojcik, et. al., "Numerical Simulation of Thick Line Width Measurements by Reflected Light", Proceeding SPIE, Vol. 1464 (1991), pp. 187–203, and G. Wojcik, et. al., "Some Image Modeling Issues for I-line, 5× phase shifting masks", Proceeding SPIE, Vol. 2197, pp. 455–465.

In the calculation of the electric field distribution in the three-dimensional space surrounding the object, the finite element method and the FDTD method [Finite Difference Time Domain method; e.g. K. Kunz and R. J. Luebbers, "The Finite Difference Time Domain Method for Electromagnetics", CRC Press (1993)] are generally used. An example of the FDTD method is shown in FIG. 9. In these methods, the space is divided into small cells, and the elements of the electromagnetic field are given as variables for each cell, thereby numerically obtaining a solution that satisfies the Maxwell's equations with respect to the incident electromagnetic field. Accordingly, the solution obtained by these methods is a three-dimensional vector distribution in the three-dimensional space of a scattered electromagnetic field resulting from the incident electromagnetic field or the entire electromagnetic field as the sum total of these electromagnetic fields.

It is publicly known that the electromagnetic field entering the three-dimensional space surrounding the object can be determined by performing the Huygens-Fresnel diffraction integral on the intensity distribution S of the effective source at the pupil position of the illuminating optical system, as shown, for example, in M. Born and E. Wolf, "principles of Optics, Sixth Edition", Pergamon Press (1980), Chapter VIII. It is also publicly known that when the NA (Numerical Aperture) of illuminating light is large, it is necessary to use a vector diffraction calculation such as that shown in B. Richards and E. Wolf. "Electromagnetic diffraction in optical systems II. Structure of the image field in an aplanatic system", Pro. Roy. Soc. A, Vol. 253, pp. 358–379. Once the incident electromagnetic field and the shape of the object are determined, it is possible to calculate a scattered electromagnetic field resulting from the incident electromagnetic field scattered by the object or the entire electromagnetic field as the sum total of the incident electromagnetic field and the scattered electromagnetic field.

Meanwhile, in the process of calculating imaging performed by the image-forming optical system from the obtained three-dimensional vector distribution of the electromagnetic field in the three-dimensional space surrounding the object, a method using Fourier optics as it is has heretofore been employed in general. Basically, Fourier optics can handle only spatially two-dimensional scalar functions, as has been stated above. Accordingly, it is necessary to convert the three-dimensional vector quantity of the electromagnetic field into a scalar quantity. Therefore, the conventional practice is to adopt a 2.5-dimensional model for the object and the incident electromagnetic field.

The term "2.5-dimensional model" means a model in which, as shown in FIGS. 13(a) and 13(b), the object and the electromagnetic field occupy a three-dimensional space (x, y, z), but both of them are in translational symmetry with respect to a one-dimensional direction (y). In the 2.5-dimensional model, the entire electromagnetic field separates independently into a TE mode [FIG. 13(a)] in which the electric field component is parallel to the y-direction, and a TM mode [FIG. 13(b)] in which the magnetic field component is parallel to the y-direction. The electromagnetic field in each of the two modes can be expressed in terms of a scalar quantity because the polarization direction is uniform. Accordingly, it can be applied to Fourier optics. More specifically, in each of the TM and TE modes, the electric field distribution in the focal plane of the image-forming optical system is obtained and convolved with the PSF (Point Spread Function) of the image-forming optical system. Alternatively, the electric field distribution is Fourier-transformed and multiplied by the pupil function of the image-forming optical system and then inversely Fourier-transformed.

Incidentally, the above-described conventional method involves the following disadvantages:

As the NA of illuminating light increases, it becomes impossible to perform an accurate electromagnetic field calculation with the 2.5-dimensional model. The reason for this is as follows. Because illuminating light is incident on the object in the shape of a cone, there are a large number of rays tilted to a considerable extent with respect to the xz-plane. Therefore, it becomes inappropriate to approximate the entire electromagnetic field with only the TE and TM modes. Further, it is impossible to calculate the imaging of an object that is not conformable to the 2.5-dimensional configuration.

In addition, it is impossible with the above-described method to calculate imaging when the image-forming optical system is focused to the inside of the object. The reason for this is that the electric field actually existing inside the object differs from the apparent electric field in the object as observed from the outside. Similarly, when the image-forming optical system is focused to the bottom of a narrow and deep hole in the object, for example, imaging cannot accurately be calculated because the influence on the electromagnetic field of the wall surface of the hole closer to the image-forming optical system than the focal position cannot be ignored.

SUMMARY OF THE INVENTION

The present invention was made in view of the above-described problems with the prior art.

Accordingly, an object of the present invention is to provide a method capable of accurate imaging calculation (simulation) even when the NA of illuminating light is large, or when the object under observation is not conformable to the 2.5-dimensional configuration, or when the image-forming optical system is focused to the inside of the object. The present invention also provides a system using the imaging simulation method and a recording medium containing an imaging simulation program for instructing a computer to execute the imaging simulation method.

To attain the above-described object, the present invention provides an imaging simulation method including a first step of calculating the electric field distribution of illuminating light entering a three-dimensional space containing an observation object. The imaging simulation method further includes a second step of calculating the electric field distribution in the three-dimensional space of scattered light generated by interaction between the illuminating light and the observation object, and a third step of calculating imaging of the scattered light performed by an image-forming optical system by using the Helmholtz-Kirchhoff integral using a characteristic Green's function group of the image-forming optical system.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 5 is a diagram for describing a computational model of an imaging simulation method according to a second embodiment of the present invention.

DESCRIPTION OF THE PREFERRED EMBODIMENTS

Regarding the embodiments of the present invention, embodiments of an imaging simulation method capable of attaining the above-described object of the present invention, together with the action and effect of each embodiment, will be described first. Then, a preferred arrangement applicable to the present invention, together with the action and effect thereof, will be explained.

Thereafter, each of the embodiments will be described. It should be noted that in the embodiments the calculation of the process of imaging taking place from the observation object to the image plane will be mainly described in regard to the computational model of the imaging simulation method according to the present invention shown in FIG. 1.

The imaging simulation method according to the present invention includes a first step of calculating the electric field distribution of illuminating light entering a three-dimensional space containing an observation object. The imaging simulation method further includes a second step of calculating the electric field distribution in the three-dimensional space of scattered light generated by interaction between the illuminating light and the observation object, and a third step of calculating imaging of the scattered light performed by an image-forming optical system by using the Helmholtz-Kirchhoff integral using a characteristic Green's function group of the image-forming optical system.

The Helmholtz-Kirchhoff integral is expressed by the following equation (2), which is shown, for example, in M. Born and E. Wolf, "Principles of Optics, Sixth Edition", Pergamon Press (1980), Chapter VIII:

$$\int\int_{\sigma}(G\partial U/\partial n - U\partial G/\partial n)ds = -U(v)\int\int_{\sigma_e}\partial G/\partial n ds \quad (2)$$

Figure 10:
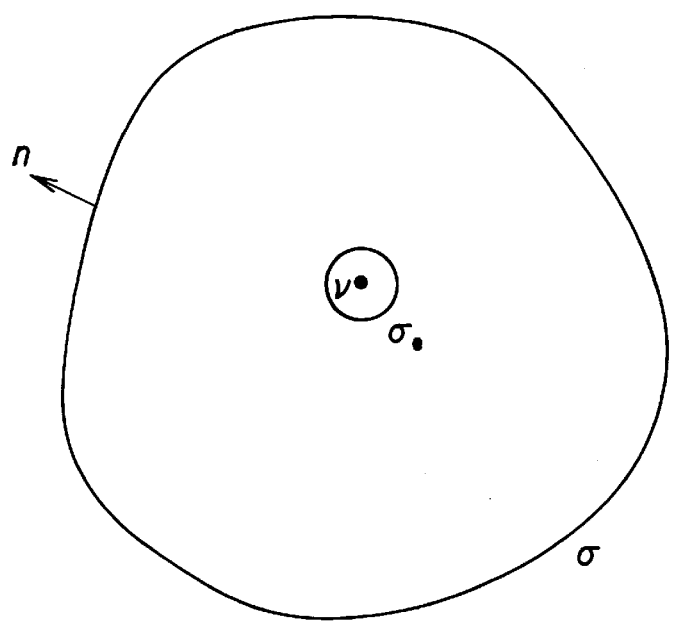
FIG. 10 is a diagram for describing the Helmholtz-Kirchhoff diffraction integral.

In the above equation (2), as shown in FIG. 10, σ denotes a closed surface surrounding the space containing a point v widely, and $\sigma_e$ denotes a closed surface contained in the space inside the closed surface σ and surrounding a small space in the neighborhood of the point v. Further, n denotes an outward normal vector on the closed surfaces σ and $\sigma_e$.

Further, U(v) is the electromagnetic field at the point v, G is a Green's function, and ∂/∂n denotes partial derivative with respect to the normal vector n. The Green's function G is a function that satisfies the Helmholtz equation, which is expressed by the following equation (3), and that has a singular point at the point v.

$(\nabla^2+k^2)G=0$ (where $k$ is the wave number of the electromagnetic field) (3)

As will be understood from equation (2), the Helmholtz-Kirchhoff integral expresses the fact that the electromagnetic field U(v) at a point v in a certain space can be obtained by the integral of the electromagnetic field over the closed surface σ and the electromagnetic field over the closed surface $\sigma_e$ by defining an appropriate Green's function. It should be noted that the electromagnetic field U does not have a singular point in the neighborhood of the point v. Therefore, it is assumed that the values of all integrals of partial derivatives with respect to the normal vector n over the closed surface $\sigma_e$ surrounding the neighborhood of the point v are zero.

In the following description, a Green's function having a singular point in the image plane of the image-forming optical system will be referred to as "characteristic Green's function". In the present invention, the set of characteristic Green's functions is referred to as "characteristic Green's function group". According to the present invention, an appropriate characteristic Green's function G is selected from among the characteristic Green's function group and used as a Green's function G to calculate the Helmholtz-Kirchhoff integral, thereby accurately performing an imaging calculation at an arbitrary point on the image plane (i.e. the calculation of the intensity and phase of light at the image position). Equations (2) and (3) hold even when the electromagnetic field U and the Green's function G (characteristic Green's function group) are both three-dimensional vector functions.

According to the present invention, the imaging calculation is performed by using the Helmholtz-Kirchhoff integral, which can handle three-dimensional vector functions. Therefore, it is unnecessary to convert the electromagnetic field U around the observation object, which is a three-dimensional vector function, into a scalar quantity. Accordingly, it becomes possible to accurately calculate imaging performed by the image-forming optical system on the basis of the electromagnetic field U, which is a three-dimensional vector function. This is useful when the entrance NA of the image-forming optical system is large, for example. In such an image-forming optical system, an unfavorably large error is produced if imaging is calculated on the basis of the electromagnetic field U determined by scalar approximation. The present invention allows imaging to be calculated with a minimal error even in such an image-forming optical system. Accordingly, the present invention makes it possible to realize imaging simulation with high accuracy as a whole.

Further, the closed space a where the Helmholtz-Kirchhoff integral is to be calculated can be set at an arbitrary position. Therefore, even when the focal plane of the image-forming optical system is inside the observation object, the present invention allows imaging to be accurately calculated by setting the closed space σ at an appropriate position outside the observation object.

A preferred embodiment of the present invention is arranged such that the above-described characteristic Green's function group includes an electric field distribution generated on the observation object side of the image-forming optical system when it is assumed that a point light source is located on the image plane of the image-forming optical system.

In this embodiment, it is possible to set a characteristic Green's function G corresponding to an arbitrary point in the image plane. In addition, because the characteristic Green's function G is concentrated on the focal plane of the image-forming optical system near the focal position, it is possible to narrow the region where the Helmholtz-Kirchhoff integration is actually carried out. This means that the computational quantity required for the imaging calculation can be reduced. Consequently, the imaging calculation can be performed at higher speed. Because the simulation according to this embodiment has the above-described imaging calculation process, simulation results can be obtained rapidly.

If an electromagnetic field distribution generated when a virtual point light source is placed at a certain position on the image plane of the image-forming optical system is set as a characteristic Green's function G of the image-forming optical system, the singular point of the characteristic Green's function G is present at the virtual point light source. Accordingly, if a closed space $\sigma_e$ is set so as to surround the virtual point light source, the electromagnetic field U at the virtual point light source position can be obtained. Then, the virtual point light source is moved within a desired region, and the Helmholtz-Kirchhoff integral is calculated at each point where the virtual point light source has been moved. Thus, it becomes possible to perform the imaging calculation for the whole image in the desired region of the image plane.

In this preferred embodiment, the characteristic Green's function group in the neighborhood of the observation object is obtained by using the Huygens-Fresnel diffraction integral on the basis of an electromagnetic field distribution virtually formed in the neighborhood of the image-side pupil position of the image-forming optical system by the virtual point light source.

As has been stated above, it is often only necessary to calculate the computational Helmholtz-Kirchhoff integral over a curved surface near a position where the characteristic Green's function G is concentrated in the neighborhood of the observation object. Accordingly, the characteristic Green's function G on the curved surface should preferably be obtained by using the Huygens-Fresnel diffraction integral on the basis of a virtual electric field distribution generated by the virtual point light source in the neighborhood of the image-side pupil position of the image-forming optical system. This method is easy and convenient from the viewpoint of computation.

In a preferred embodiment of the present invention, characteristic Green's functions constituting the characteristic Green's function group are in translational relation to each other in the three-dimensional space containing the observation object.

In optical systems that are aplanatic and telecentric on the entrance side, e.g. microscopes and steppers, it is only necessary to previously obtain a characteristic Green's function G at a representative image position, e.g. an axial position. The reason for this is that in the above-described optical systems a characteristic Green's function G corresponding to an image position other than the representative image position (e.g. an off-axis position) can also be regarded as one that is obtained by translating the characteristic Green's function G at the representative image position. Accordingly, if a characteristic Green's function G at the representative image position is obtained in advance, it becomes unnecessary to repeat the Huygens-Fresnel diffraction integral operation, which requires a great deal of time for calculation, at each position. Therefore, this embodiment allows the computing efficiency to be increased conveniently without degrading the calculation accuracy.

In a preferred embodiment of the present invention, at the above-described third step, the Helmholtz-Kirchhoff integral is calculated over a curved surface crossing the optical axis near the focal position of the image-forming optical system.

A characteristic Green's function G defined by an electromagnetic field produced from a virtual point light source on the image plane of the image-forming optical system is concentrated on the object-side focal plane of the image-forming optical system near the focal position. Therefore, a closed surface σ is set so as to cross the optical axis at a position closer to the image-forming optical system than the observation object in the neighborhood of the position where the characteristic Green's function G is concentrated. Consequently, a region on the closed surface σ where the characteristic Green's function G is not substantially zero is localized in a narrow area. Therefore, it is possible to improve the calculation accuracy when the left-hand side of equation (3) is calculated. This will be explained below with reference to FIG. 11.

Figure 11:
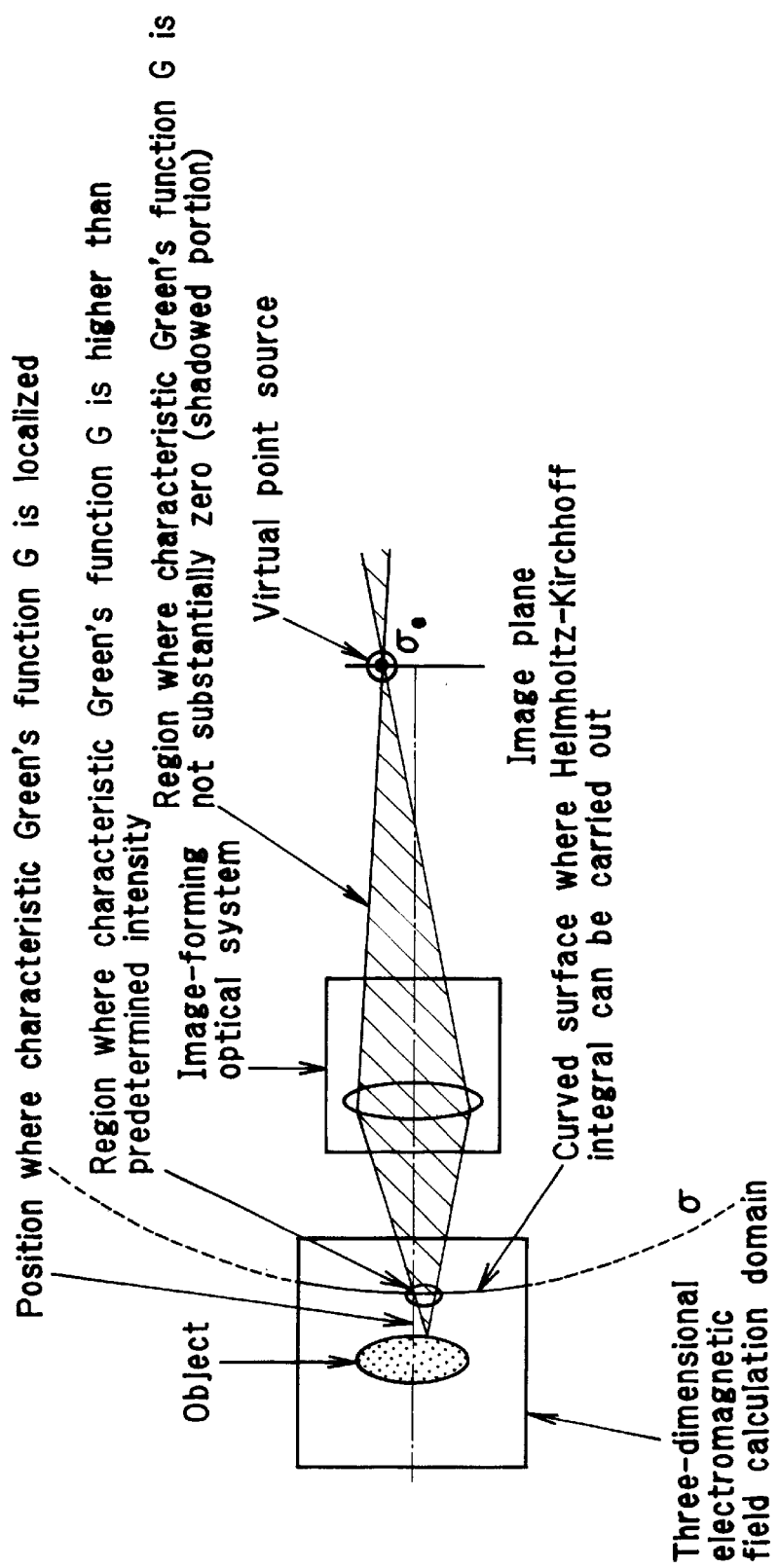
FIG. 11 is a diagram for describing the Helmholtz-Kirchhoff diffraction integral in a case where the singular point of a Green's function is a virtual point source on the image plane.
Figure 12:
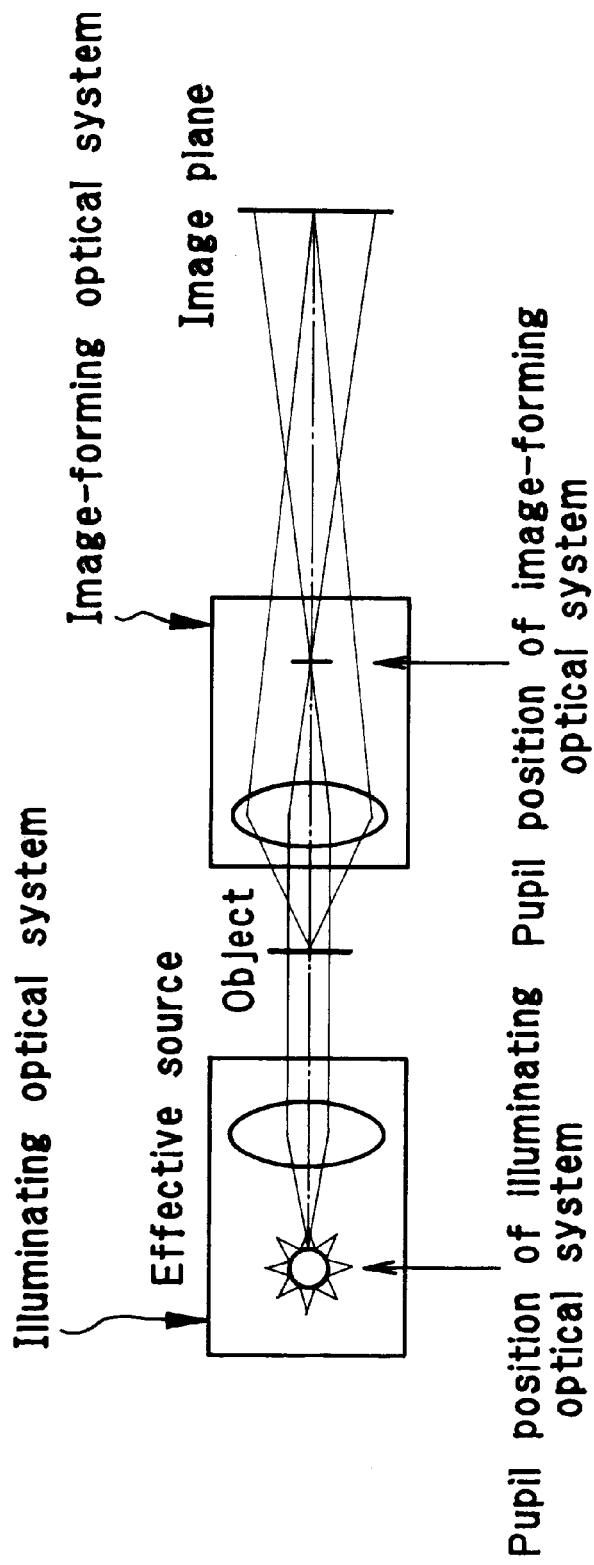
FIG. 12 is a diagram for describing the imaging theory based on Fourier optics.
Figure 13A:
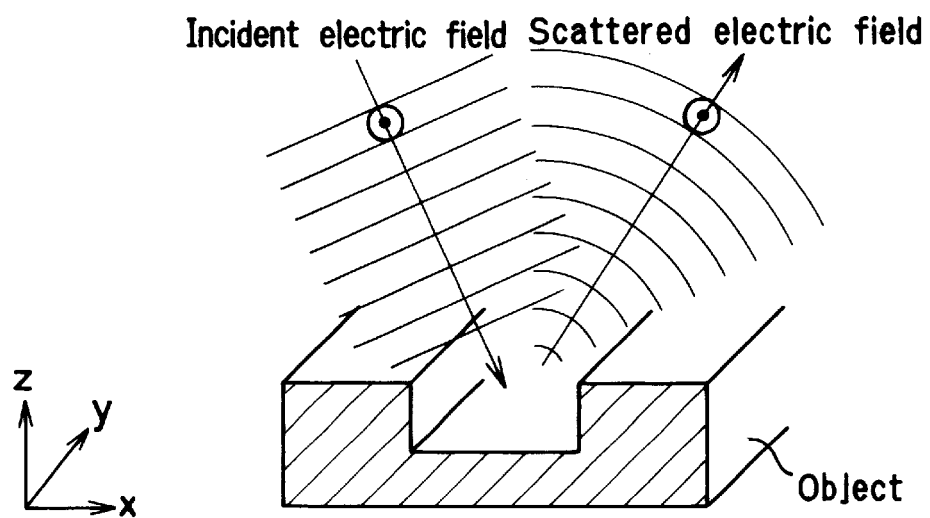
FIGS. 13(a) and 13(b) are diagrams for describing a 2.5-dimensional diffraction model.
Figure 13B:
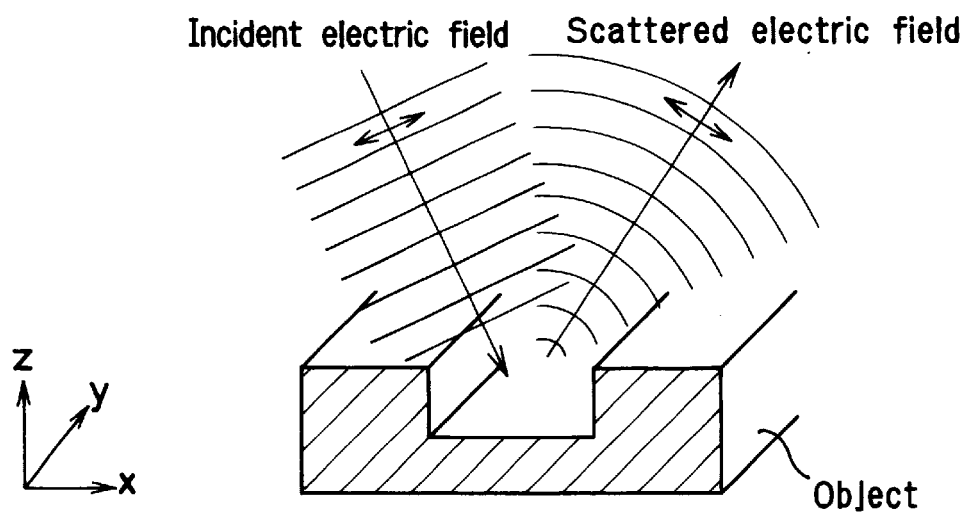

The three-dimensional electromagnetic field calculation domain where the three-dimensional electromagnetic field calculation is performed around the observation object is limited by the performance of the computer used. In the FDTD method, for example, the three-dimensional electromagnetic field calculation domain is approximately equal in size to a cube in which each side is 10 wavelengths long at the most. The region where the Helmholtz-Kirchhoff integration can be actually carried out to calculate the three-dimensional electromagnetic field is an area on the closed surface σ that is cut off by the three-dimensional electromagnetic field calculation domain. That is, as shown in FIG. 11, of the closed surface σ, which is shown by the broken line, a portion inside the quadrangular frame, which is shown by the solid line, is an integrable region. However, the region where the Helmholtz-Kirchhoff integration should be carried out is the whole closed surface σ, including the region shown by the broken line. Therefore, if the integration can be carried out only inside the three-dimensional electromagnetic field calculation domain, the value of the Helmholtz-Kirchhoff integral calculated in a region outside the three-dimensional electromagnetic field calculation domain, where the integration cannot actually be carried out, becomes a calculation error.

However, a region where the characteristic Green's function G having a virtual point light source on the image plane of the image-forming optical system is not substantially zero in the neighborhood of the observation object is limited by the image-forming optical system, and this region is concentrated near the focal position of the image-forming optical system. This means that, in a region away from the concentrated region, the characteristic Green's function G has only an extremely small value. Therefore, the positional relationship between the constituent elements of the system is set so that the concentrated region is within the three-dimensional electromagnetic field calculation domain. Further, the closed surface σ is set so as to cross the optical axis near the position where the characteristic Green's function G is concentrated. With this arrangement, the value of the Helmholtz-Kirchhoff integral calculated over the closed surface σ outside the three-dimensional electromagnetic field calculation domain becomes extremely smaller than the value of the integral calculated inside the three-dimensional electromagnetic field calculation domain. Thus, in this embodiment, the calculation error arising from the integration carried out outside the three-dimensional electromagnetic field calculation domain is minimized. Consequently, the calculation accuracy improves favorably.

In a preferred embodiment of the present invention, the Helmholtz-Kirchhoff integration is carried out only in a region on the above-described curved surface where the intensity of the characteristic Green's function G is higher than a predetermined intensity.

According to this embodiment, when the characteristic Green's function G is concentrated, the region of integration on the left-hand side of equation (3) may be narrow. Therefore, the time required for calculation can be shortened, advantageously. This will be explained below with reference to FIG. 11 again. As has been stated above, the region where the Helmholtz-Kirchhoff integration can be carried out is within the three-dimensional electromagnetic field calculation domain, which is enclosed by the quadrangular frame in the figure. Therefore, the integration is usually carried out within this region.

However, when the region where the characteristic Green's function G is not substantially zero is sufficiently concentrated, it is not always necessary to carry out the integration in the entire region on the closed surface σ within the three-dimensional electromagnetic field calculation domain. The desired calculation accuracy may be obtained even if the integration is carried out only in a region where the intensity of the characteristic Green's function G is higher than a predetermined intensity. In such a case, the region where the computational Helmholtz-Kirchhoff integration is carried out is restricted within a region in which the intensity of the characteristic Green's function G has a larger value than that of the predetermined intensity, whereby the time required for calculation can be reduced advantageously. It should be noted that the term "sufficiently concentrated" as used herein means a state where, when the three-dimensional electromagnetic field calculation domain is divided into some small regions, the intensity of the characteristic Green's function G is markedly higher only in a specific small region than in the other small regions.

In this preferred embodiment, at the second step, the electric field distribution of the scattered light is calculated by using the FDTD method. There are various other three-dimensional electromagnetic field calculation methods, e.g. the finite element method, the boundary element method, and the mode matching method. Among these methods, the FDTD allows calculation to be carried out in the largest region, at present, to determine an electric field distribution in a three-dimensional space generated by an object having an arbitrary configuration. Therefore, it is possible to use a wide area for the calculation of the Helmholtz-Kirchhoff integral. Thus, this embodiment makes it possible to minimize calculation errors due to the value of the Helmholtz-Kirchhoff integral calculated in the region outside the three-dimensional electromagnetic field calculation domain and is therefore favorable from the viewpoint of improving the calculation accuracy.

In a preferred embodiment of the present invention, it is desirable that, at the above-described first step, the electric field distribution of the illuminating light should be calculated from a coherent element of an illuminating light source. When a coherent light source, e.g. a laser light source, is used, the illuminating light source has a single coherent element. Therefore, the electric field distribution in the image plane can be calculated from only the single coherent element. Accordingly, the calculation of the intensity and phase of light in the image plane can be completed by a single operation. Thus, the embodiment is favorable from the viewpoint of the computing efficiency.

In a preferred embodiment of the present invention, the intensity of light on the image plane calculated for each coherent element of the illuminating light source is summed up. According to this embodiment, even when the illuminating light source is not coherent, the electric field distribution in the image plane can be calculated for each coherent element of the illuminating light source. By using the electric field distribution calculated for each coherent element, the intensity of light at each individual point on the image plane is calculated, and the intensities at these points are summed up. By doing so, imaging can be accurately calculated.

In this preferred embodiment, the electric field distribution of the illuminating light is calculated on the basis of the Huygens-Fresnel diffraction integral of the product of the spatial distribution for each coherent element of the illuminating light source and the pupil function of the illuminating optical system. In Köhler illumination, a light source image is projected at the pupil position of the illuminating optical system. In this regard, this embodiment allows imaging in Köhler illumination to be calculated easily with high accuracy.

In a preferred embodiment of the present invention, the electric field distribution of the illuminating light is calculated on the basis of the convolution integral of the spatial distribution for each coherent element of the illuminating light source with the Huygens-Fresnel diffraction integral of the pupil function of the illuminating optical system. In critical illumination, a point source is imaged onto the focal plane of the image-forming optical system. In this regard, the embodiment of the present invention allows imaging in critical illumination to be calculated easily with high accuracy.

In this preferred embodiment, the electric field distribution of the illuminating light is calculated on the basis of the convolution integral of the spatial emission distribution of a laser light source with the Huygens-Fresnel diffraction integral of the pupil function of the illuminating optical system. In an LSM (Laser Scanning Microscope), illuminating light is all coherent. Therefore, this embodiment allows efficient imaging calculation in the LSM.

The imaging simulation system according to the present invention uses an imaging simulation method described above as an embodiment of the present invention. The recording medium according to the present invention contains an imaging simulation program for instructing a computer to execute an imaging simulation method described above as an embodiment of the present invention. Accordingly, the imaging simulation system and the recording medium have the action and effect similar to those stated in the foregoing embodiments. Therefore, a description thereof is omitted.

Embodiments of the present invention will be described below with reference to the accompanying drawings.

Figure 1:
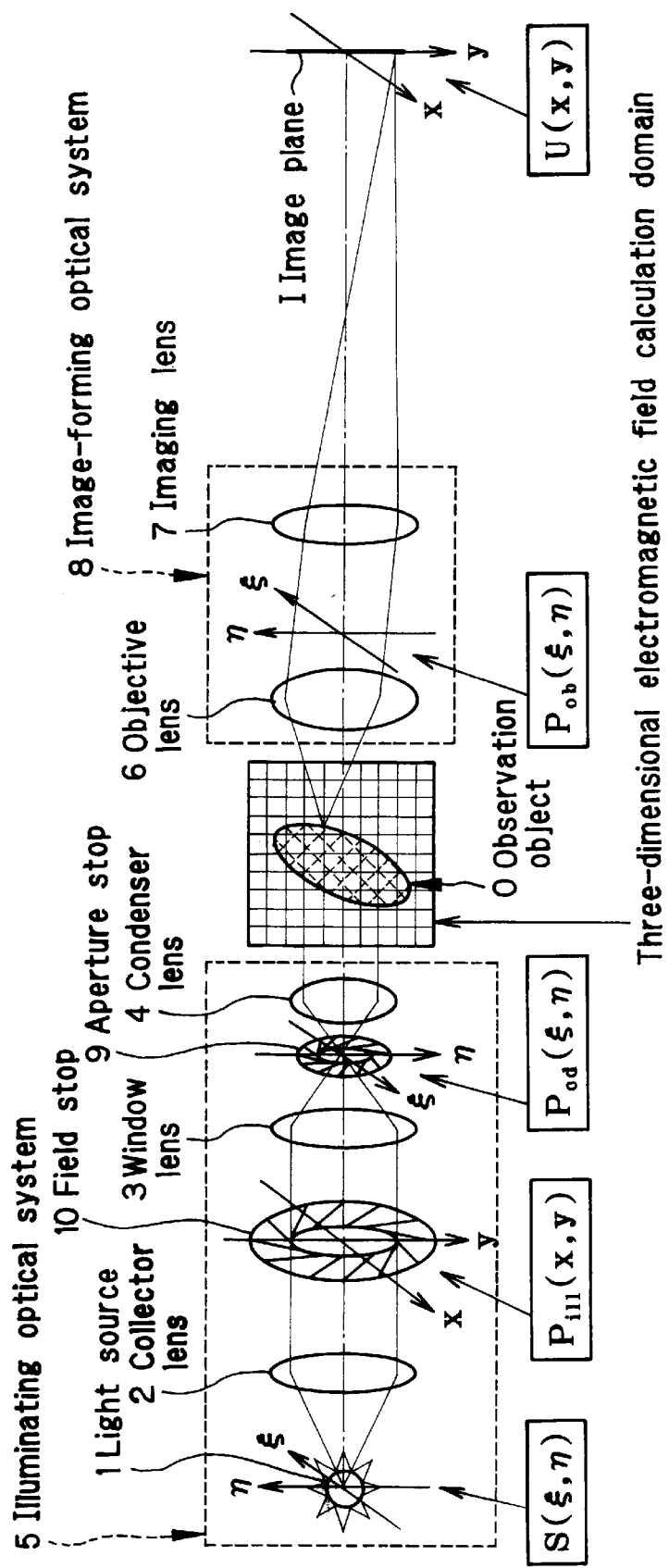
FIG. 1 is a diagram for describing a computational model of an imaging simulation method according to a first embodiment of the present invention.

As shown in FIG. 1, a computational model of an imaging simulation method according to a first embodiment of the present invention has an illuminating optical system 5, an observation object O, an image-forming optical system 8, and an image plane I. The illuminating optical system 5 includes a light source 1, a collector lens 2, a window lens 3, and a condenser lens 4. The image-forming optical system 8 includes an objective lens 6 and an imaging lens 7. The illuminating optical system 5 is arranged to perform Köhler illumination for the observation object O. That is, illuminating light emitted from the light source 1 is collimated through the collector lens 2, and a light source image is formed in the front focal plane of the condenser lens 4 through the window lens 3.

An aperture stop 9 is placed at the position where the light source image is formed. The aperture stop 9 limits the area of the light source image that participates in illumination. Accordingly, the aperture stop 9 controls the amount of illuminating light reaching the observation object O and also the degree of coherence of the entire illuminating light. A field stop 10 is present on the front focal plane of the window lens 3. The image of the field stop 10 is projected on the observation object O through the window lens 3 and the condenser lens 4 to limit the illuminating range of the observation object O. In this case, the position of the light source 1 and the position of the aperture stop 9 are conjugate to each other, and the position of the field stop 10 and the position of the observation object O are also approximately conjugate to each other.

Each step of the imaging simulation method according to the present invention will be described below.

At the first step, the electric field distribution of illuminating light entering a three-dimensional space containing the observation object O is calculated. Accordingly, at this step, each of the optical element presents in the optical path from the light source 1 to the observation object O in the computational model shown in FIG. 1 is used as a parameter for the calculation. For explanatory simplicity, the projection magnification is ignored in the following description.

In-plane coordinates of the light source plane and those of the aperture stop plane are expressed in the form of $(\xi, \eta)$, and in-plane coordinates of the field stop plane are expressed in the form of $(x, y)$. Assuming that the emission intensity distribution in the light source plane is $S(\xi, \eta)$ and the amplitude transmission function of the pupil of the optical system from the collector lens 2 to the window lens 3 that is set in the field stop plane is $P_{ill}(x, y)$, the amplitude distribution $A_{cd}(\xi, \eta; \xi_s, \eta_s)$ formed at the front focal position of the condenser lens 4 by light emitted from a point $(\xi_s, \eta_s)$ in the light source plane is expressed by $$A_{cd}(\xi, \eta; \xi_s, \eta_s) = \{(S(\xi_s, \eta_s))\}^{1/2} \times {}^F P_{ill}(\xi-\xi_s, \eta-\eta_s) \quad (4)$$

where ${}^F P_{ill}(\xi, \eta)$ is a Fourier transform of $P_{ill}(x, y)$.

When the amplitude distribution of a certain coherent element at the front focal position of the condenser lens 4 is given by $A_{cd}(\xi, \eta)$, if the amplitude transmission function of the pupil of the condenser lens 4 that is set in the plane of the aperture stop 9 is denoted by $P_{cd}(\xi, \eta)$, the electric field distribution of illuminating light entering the three-dimensional space (x, y, z) surrounding the observation object O, that is, the incident electric field $E_{in}$ (x, y, z), is obtained by using the following Huygens-Fresnel diffraction integral:

$$E_{in}(x, y, z) = \int\int A_{cd}(\xi, \eta) P_{cd}(\xi, \eta) \times \exp(-jk \cos \epsilon_{cd}) d\xi d\eta \quad (5)$$

where $\cos \epsilon_{cd} = \{\xi x + \eta y + (f_{cd}^2 - \xi^2 - \eta^2)^{1/2} z\}/f_{cd}$, where $f_{cd}$ is the focal length of the condenser lens 4.

Figure 2:
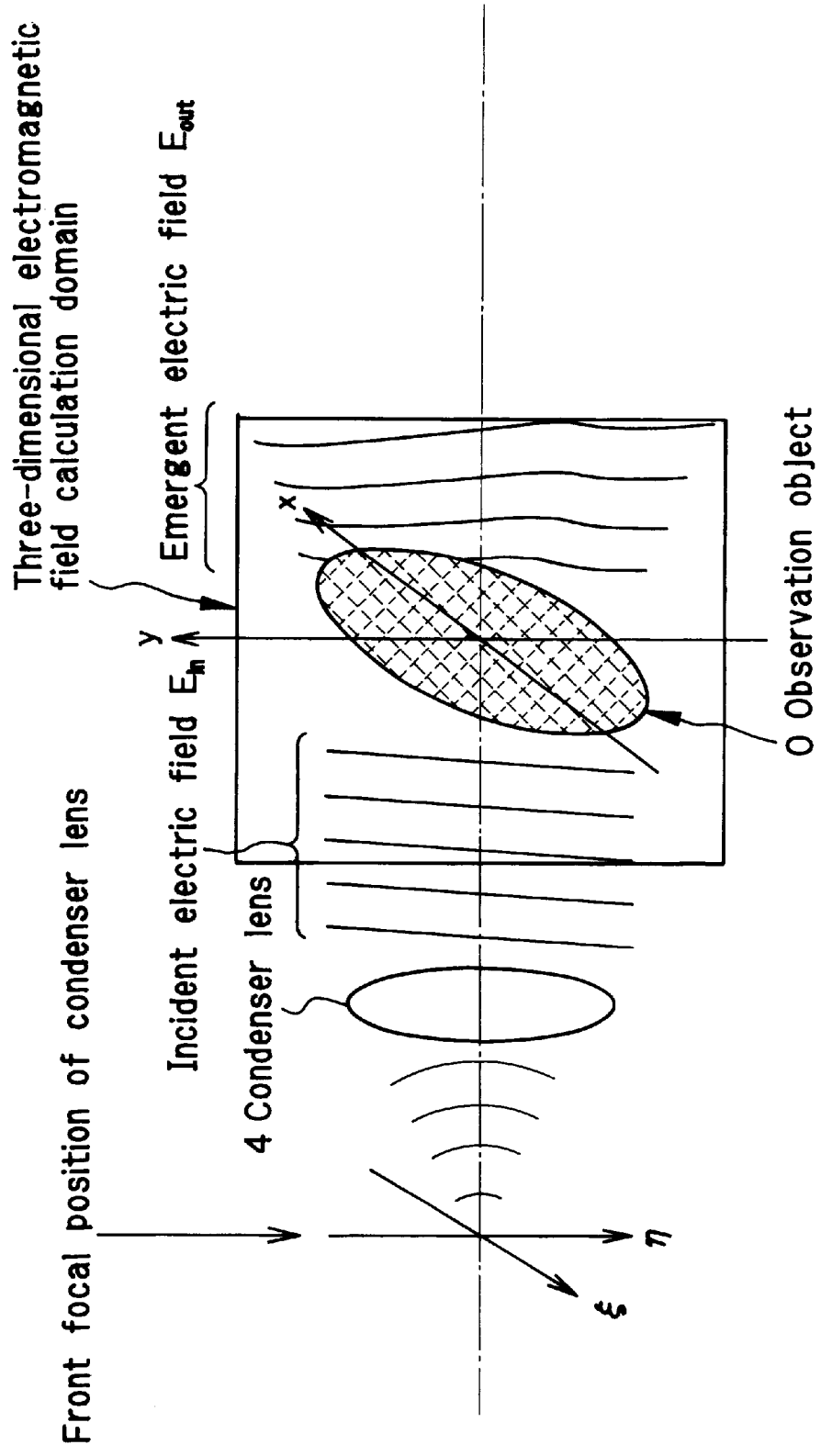
FIG. 2 is a diagram for describing the calculation of an electric field distribution in a three-dimensional space surrounding an object in the first embodiment of the present invention.

Next, at the second step, the electric field distribution of scattered light generated by interaction between the illuminating light and the observation object is calculated. The calculation domain is a three-dimensional space containing the observation object O and its neighborhood. The incident electric field $E_{in}$ calculated at the first step is incident on the observation object O, as shown in FIG. 2. The incident electric field $E_{in}$ is scattered by the observation object O to become an emergent electric field $E_{out}$. The emergent electric field $E_{out}$ represents the electric field distribution of the scattered light. At the second step, the FDTD method is used to obtain the emergent electric field $E_{out}$. It should be noted that a specific calculation method for the FDTD method is described in detail, for example, in K. Kunz and R. J. Luebbers, "The Finite Difference Time Domain Method for Electromagnetics", CRC Press (1993). Therefore, a description thereof is herein omitted. However, let us point out that the FDTD method is an electromagnetic field analyzing method capable of calculation using three-dimensional vector functions.

Next, at the third step, a calculation is performed with respect to an image formed in the image plane through the image-forming optical system. At this step, the electric field distribution of the scattered light calculated at the second step and the image-forming optical system 8 shown in FIG. 1 are used as parameters for the calculation.

The emergent electric field $E_{out}$ (the electric field distribution of the scattered light) calculated at the second step is expressed in terms of a three-dimensional vector function. Accordingly, imaging performed by the image-forming optical system has to be calculated by using a three-dimensional vector function. Therefore, in this embodiment, the Helmholtz-Kirchhoff integral is used to perform imaging calculation. Further, a characteristic Green's function group is used to execute the diffraction integration. It should be noted that the characteristic Green's function group (characteristic Green's function G) is expressed by the electric field formed in the three-dimensional space surrounding the observation object O by a virtual point light source as disposed in the image plane I. Therefore, characteristic Green's functions constituting the function group in general differ from each other according to the position of the virtual point light source located in the image plane I.

Therefore, to perform imaging calculation in this embodiment, the image-forming optical system 8 is assumed to be aplanatic. Further, the characteristic Green's function G expressed by the electric field formed in the three-dimensional space surrounding the observation object O by a virtual point source as placed on the optical axis of the image plane I is defined as "the characteristic Green's function at the representative image position". Consequently, because the image-forming optical system 8 is assumed to be aplanatic, all characteristic Green's functions G at various points in a desired calculation domain can be regarded as having an electric field distribution of the same configuration as "the characteristic Green's function at the representative image position". Accordingly, it is unnecessary to calculate the characteristic Green's function G for each point. As a result, the computing time required for the imaging simulation can be shortened.

Further, it is assumed in this embodiment that the pupil position of the image-forming optical system 8 is at the pupil position (back focal position) of the objective lens 6. On this assumption, if the amplitude transmission function of the pupil of the image-forming optical system 8 is denoted by $P_{ob}(\xi, \eta)$, the characteristic Green's function $G_i(x, y, z; x_i, y_i)$ corresponding to a point $(x_i, y_i)$ in the image plane I is given by the following equation if the Huygens-Fresnel diffraction integral is used:

$$G_i(x, y, z; x_i, y_i) \equiv G_i^0(x-x_i, y-y_i, z) = \quad (6)$$
$$\int\int P_{ob}(\xi, \eta) \exp(-jk\cos\epsilon_{ob}) d\xi d\eta$$

where $\cos \epsilon_{ob} = \{\xi(x-x_i) + \eta(y-y_i) + (f_{ob}^2 - \xi^2 - \eta^2)^{1/2} z\}/f_{ob}$, and where $G_i^0$ is the characteristic Green's function on the optical axis of the image plane I, and $f_{ob}$ is the focal length of the objective lens 6.

Figure 3:
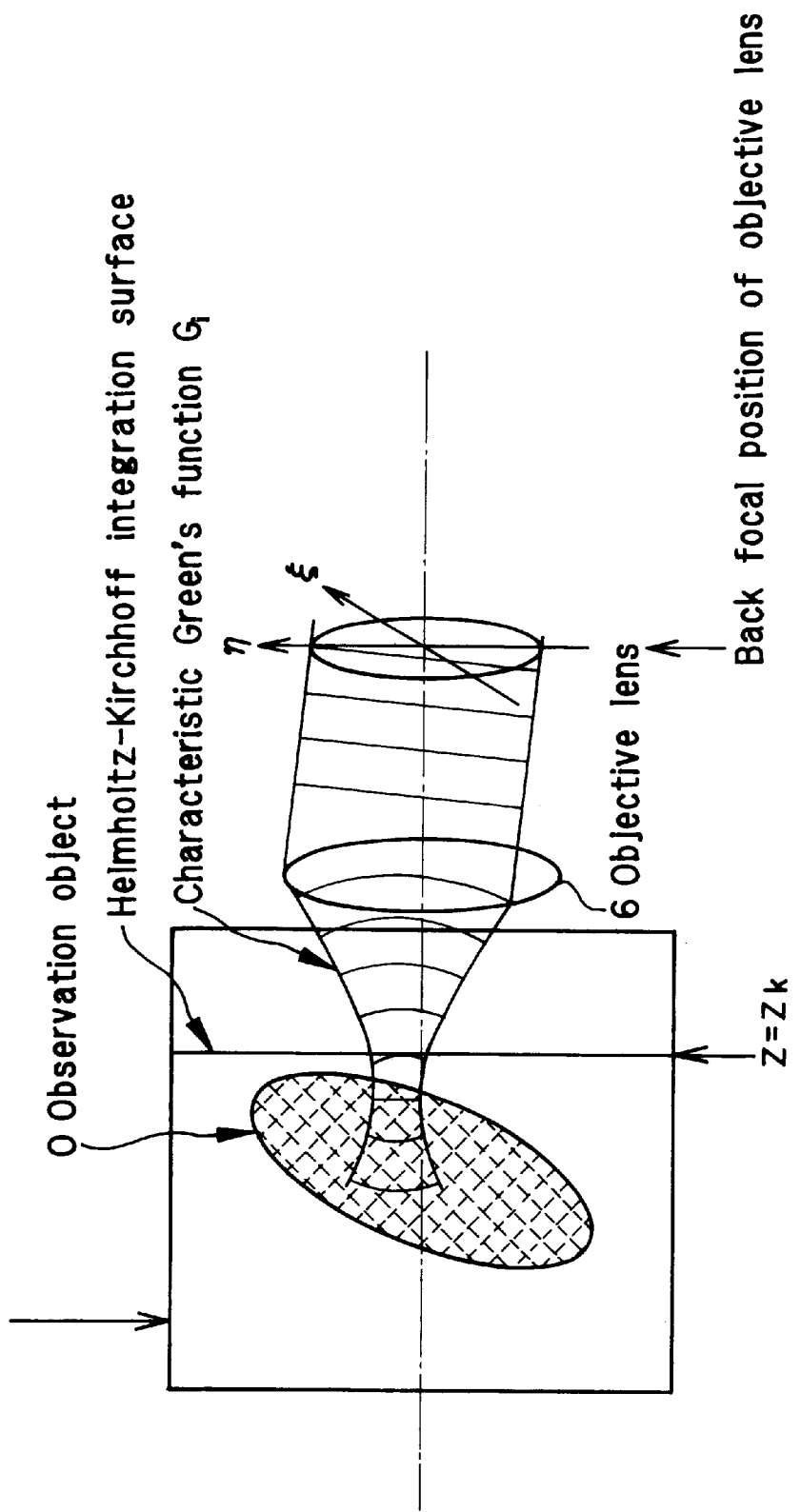
FIG. 3 is a diagram for describing the region of the Helmholtz-Kirchhoff diffraction integration in the first embodiment of the present invention.

Incidentally, it is preferable that the surface where the Helmholtz-Kirchhoff integration is carried out should be present on the image-forming optical system 8 side of the observation object O and as close to the position where the characteristic Green's function $G_i$ is concentrated as possible. FIG. 3 shows the way in which the electric field from the virtual point light source located in the image plane is concentrated inside the observation object O by the objective lens 6. In this case, the position where the characteristic Green's function $G_i$ is most concentrated lies inside the observation object O.

To perform the Helmholtz-Kirchhoff integration in FIG. 3, the surface where the Helmholtz-Kirchhoff integration is carried out is set in a plane of $z=z_k$ close to the observation object O. The characteristic Green's function $G_i^0$ $(x-x_i, y-y_i, z)$ is specified as a function $G_i^0(x-x_i, y-y_i, 2z_k-z)$ that is reflected from the plane of $Z=Z_k$. As shown in the following equation (7), $G_i^0(x-x_i, y-y_i, 2z_k-z)$ is subtracted from $G_i^0(x-x_i, y-y_i, z)$ to obtain a new characteristic Green's function $G^0(x-x_i, y-y_i, z)$ (see J. W. Goodman, "Introduction to Fourier Optics", McGraw-Hill, Inc. 1968, pp. 43–44). The new characteristic Green's function $G^0(x-x_i, y-y_i, z)$ is used in the Helmholtz-Kirchhoff integration.

$$G^0(x-x_i, y-y_i, z) = G_i^0(x-x_i, y-y_i, z) - G_i^0(x-x_i, y-y_i, 2z_k-z) \quad (7)$$

The reflected function $G_i^0(x-x_i, y-y_i, 2z_k-z)$ has no singular point inside the virtual closed surface σ containing the plane where the Helmholtz-Kirchhoff integration is carried out. Therefore, equation (3) still holds. The term corresponding to the first term of integration on the left-hand side of equation (3) is zero. Thus, the amplitude $A(x_i, y_i)$ of the electric field at the image position $(x_i, y_i)$ can be obtained from the following simple equation:

$$A(x_i, y_i) = \iint E_{out}(x, y, z_k) \times \partial G^0(x-x_i, y-y_i, z)/\partial z|_{z=z_k} dx dy \quad (8)$$

In the foregoing, we have discussed the three steps used in the imaging simulation method according to this embodiment.

Incidentally, the procedure of the above-described equations (5) to (8) is carried out for each coherent element of the light source 1. If it is a non-laser light source such as a halogen lamp, the light source 1 is expressed by the coherent elements and a delta function at each position $(\xi_s, \eta_s)$ in the light source plane. Accordingly, the intensity $I(x_i, y_i)$ of the image observed can be obtained by $$I(x_i, y_i) = \iint |A(x_i, y_i; \xi_s, \eta_s)|^2 d\xi_s d\eta_s$$

Figure 4:
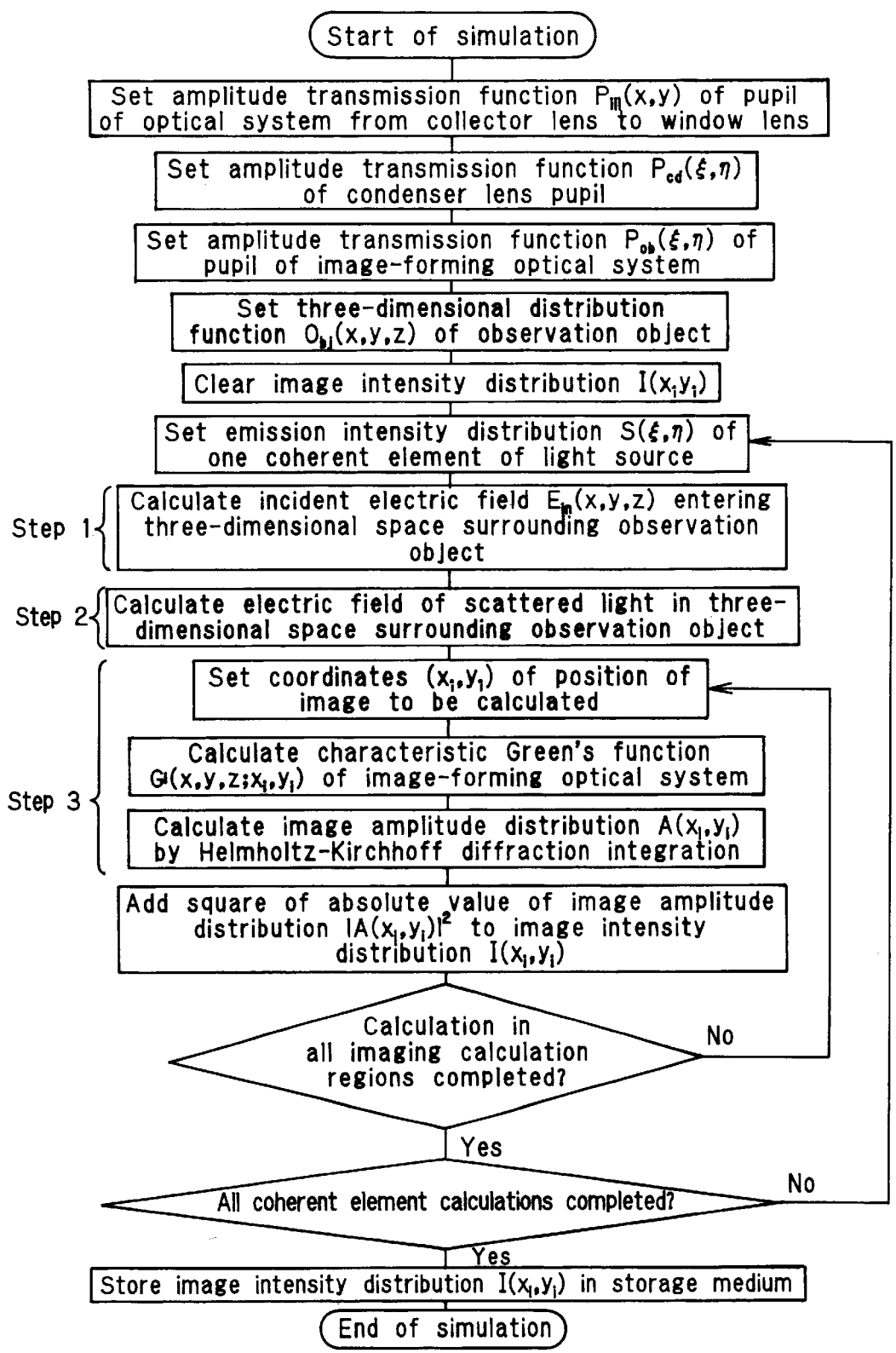
FIG. 4 is a flowchart showing the imaging simulation method according to the first embodiment of the present invention.

The flow of the above-described imaging simulation method according to the first embodiment of the present invention is shown in FIG. 4. The contents of each step are as shown in the flowchart. The flow of the imaging simulation method will be clear from the foregoing description and the contents shown in the flowchart. Therefore, a description of the flow is omitted.

Next, an imaging simulation method according to a second embodiment of the present invention will be described. FIG. 5 shows a computational model of the imaging simulation method according to this embodiment. As shown in the figure, the computational model is an LSM (Laser Scanning Microscope) comprising a laser 11 and a beam expander 15 including a first convex lens 12, a second convex lens 13, and a first pinhole 14. The LSM further comprises a beam splitter 16, an objective 17, an observation object O, a condenser lens 18, a second pinhole 19, and a PMT (Photo Multiplier Tube) 20. It should be noted that the actual LSM further has a scanning optical system formed from a galvanometer mirror as a constituent element. However, the scanning optical system is omitted on purpose to perform imaging simulation.

A monochromatic coherent illuminating light beam emitted from the laser 11 is collected through the first convex lens 12 in the beam expander 15 and passes through the first pinhole 14 to remove noise therefrom. Then, the illuminating light beam is formed into a parallel beam through the second convex lens 13. The parallel light beam passes through the beam splitter 16 and is then collected through the objective 17 to form a diffraction spot on the observation object O. Light reflected from the observation object O passes through the objective 17 and is then reflected by the beam splitter 16 and collected through the condenser lens 18. The second pinhole 19 is placed at the position where the light is collected through the condenser lens 18. Only light passing through the second pinhole 19 is detected by the PMT 20.

Imaging simulation in this embodiment is performed as follows. Assuming that the diameter of the first pinhole 14 is substantially equal to infinitesimal, the observation object O is moved with respect to the optical axis of the objective 17, and while doing so, the axial light intensity at the position of the second pinhole 19 is calculated.

The first step is the calculation of the electric field distribution of illuminating light. The electric field entering a three-dimensional space surrounding the observation object O in this embodiment can be determined by calculating the Huygens-Fresnel diffraction integral of the multiplication of the beam profile of the illuminating light at the back focal position of the objective 17 by the pupil function of the objective 17.

Figure 6A:
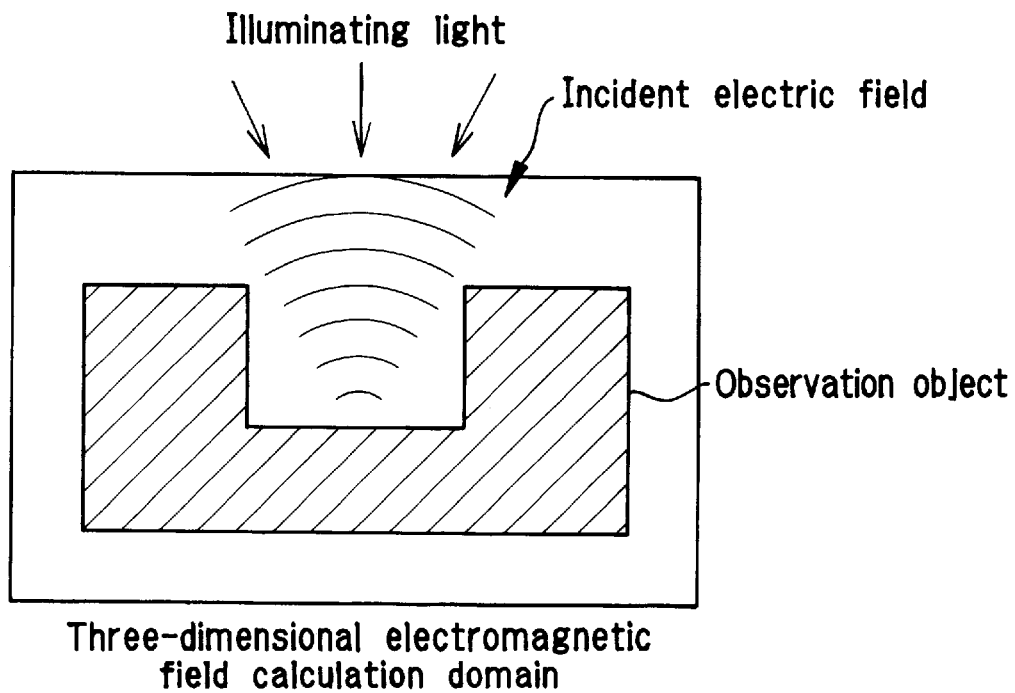
FIGS. 6(a) and 6(b) are diagrams for describing an incident electric field and a scattered electric field in a three-dimensional space surrounding an observation object in the second embodiment of the present invention.
Figure 6B:
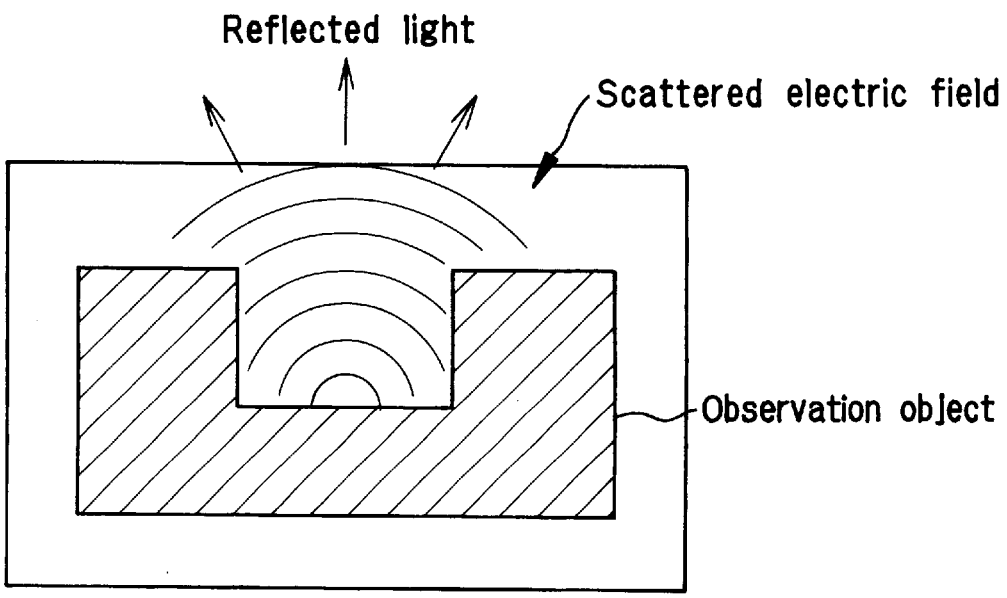

The second step is the calculation of the electric field distribution of scattered light generated by the interaction between the illuminating light and the observation object O. The calculation of the electric field in the three-dimensional space surrounding the observation object O is carried out as follows. As shown in FIG. 6(a), the illuminating light is applied as an incident electric field. Then, as shown in FIG. 6(b), the electric field scattered by the observation object O is calculated by using the FDTD method.

The third step is the calculation regarding the image formed in the image plane. In the case of incident-light illumination as in this embodiment, illuminating light will not directly re-enter the objective 17. Therefore, the Helmholtz-Kirchhoff integration is carried out by using the scattered electric field and the characteristic Green's function. Here, the characteristic Green's function can be defined as an electric field produced around the observation object O when a virtual point light source is placed at the position of the second pinhole 19. It should be noted, however, that if the diameter of the first pinhole 14 is as small as the diameter of the second pinhole 19, the calculation of the characteristic Green's function can be omitted by using the incident electric field as it is.

In the foregoing, we have discussed the three steps used in the imaging simulation method according to this embodiment.

Figure 7:
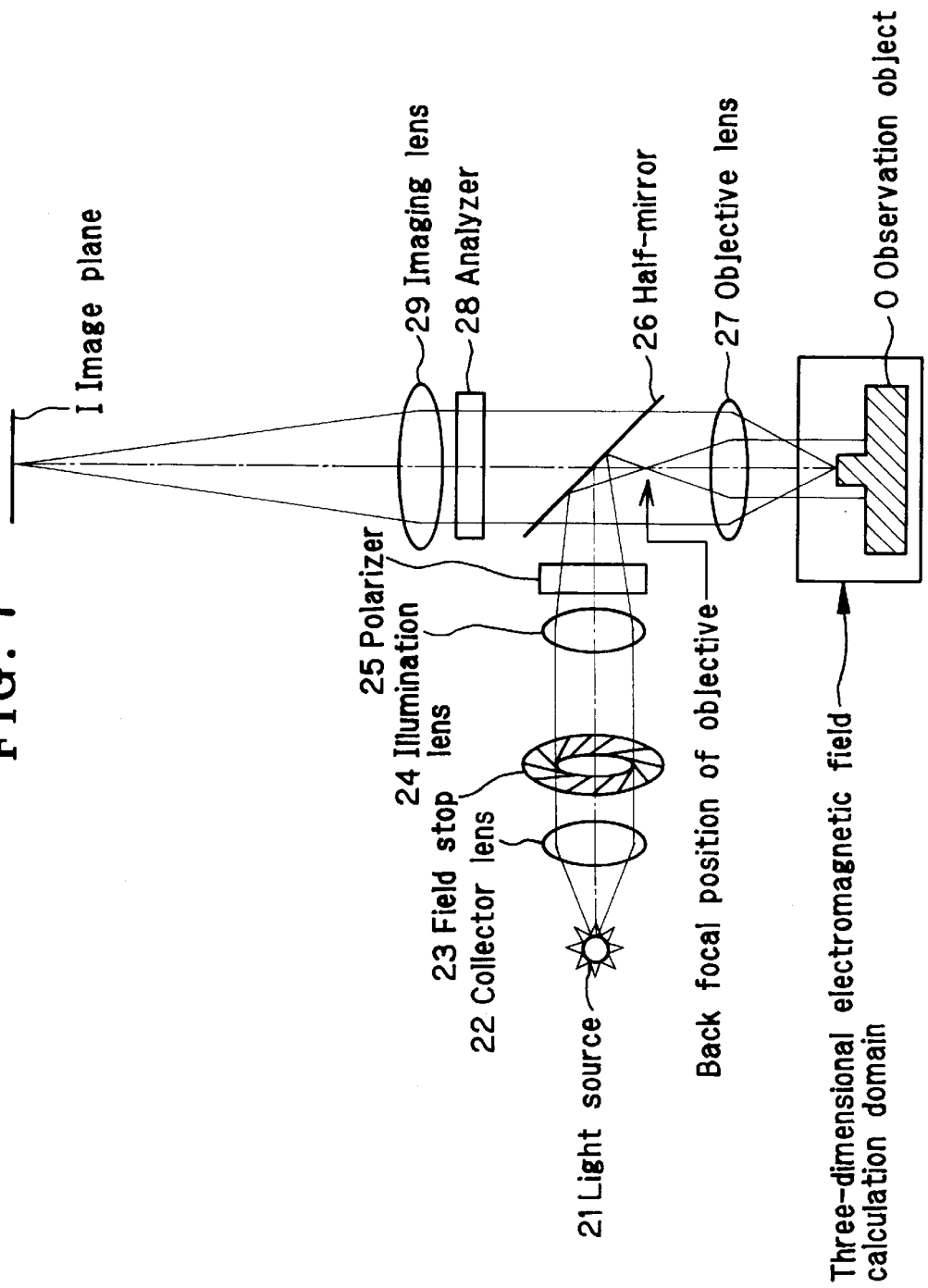
FIG. 7 is a diagram for describing a computational model of an imaging simulation method according to a third embodiment of the present invention.

A computational model of an imaging simulation method according to a third embodiment of the present invention is shown in FIG. 7. The illustrated computational model is an incident-light type polarization microscope comprising a light source 21, a collector lens 22, a field stop 23, an illumination lens 24, a polarizer 25, a half-mirror 26, an objective 27, an analyzer 28, and an imaging lens 29.

Illuminating light emitted from the light source 21 is collimated through the collector lens 22 and passes through the field stop 23, whereby the beam diameter of the illuminating light is limited. Then, the illuminating light is collected at the back focal position of the objective 27 through the illumination lens 24. The polarizer 25 is placed between the illumination lens 24 and the objective 27. The illuminating light is formed into linearly polarized light having a uniform vibration direction, by the polarizer 25. The illuminating light passing through the polarizer 25 is reflected by the half-mirror 26 and formed into a parallel beam through the objective 27 to illuminate the observation object O in a Köhler illumination manner.

Light reflected from the observation object O is collected through the objective 27 and emerges from the objective 27 in the form of a parallel beam. The light passes through the half-mirror 26 and enters the analyzer 28. The analyzer 28 extracts only the crossed Nicol component, in which the direction of vibration is perpendicular to the vibration axis of the polarizer 25. Thereafter, an image of the observation object O is formed in the image plane I through the imaging lens 29.

In a case where the system is concerned with polarization as in this embodiment, the crossed Nicol component, which relates to image formation, is much weaker than the overall intensity of illuminating light. Therefore, it is necessary that the calculation of the incident electric field in the three-dimensional space surrounding the observation object O and the calculation of the characteristic Green's function group should be performed with high accuracy by using a vector diffraction calculation.

As has been stated above, a virtual point source is placed at an arbitrary point in the image plane I. A light beam emitted from the virtual point source is collimated through the imaging lens 29 and formed into linearly polarized light through the analyzer 28. Accordingly, the calculation of the characteristic Green's function group is made by performing a vector diffraction calculation on linearly polarized light having a vibration direction parallel to that of the analyzer 28 at the back focal position of the objective 27.

To calculate an image formed by a parallel Nicol component in this embodiment, a characteristic Green's function should be used which is obtained by calculating the vector diffraction integral of a parallel beam of linearly polarized light having a vibration direction parallel to that of the polarizer 25 at the back focal position of the objective 27.

Figure 8:
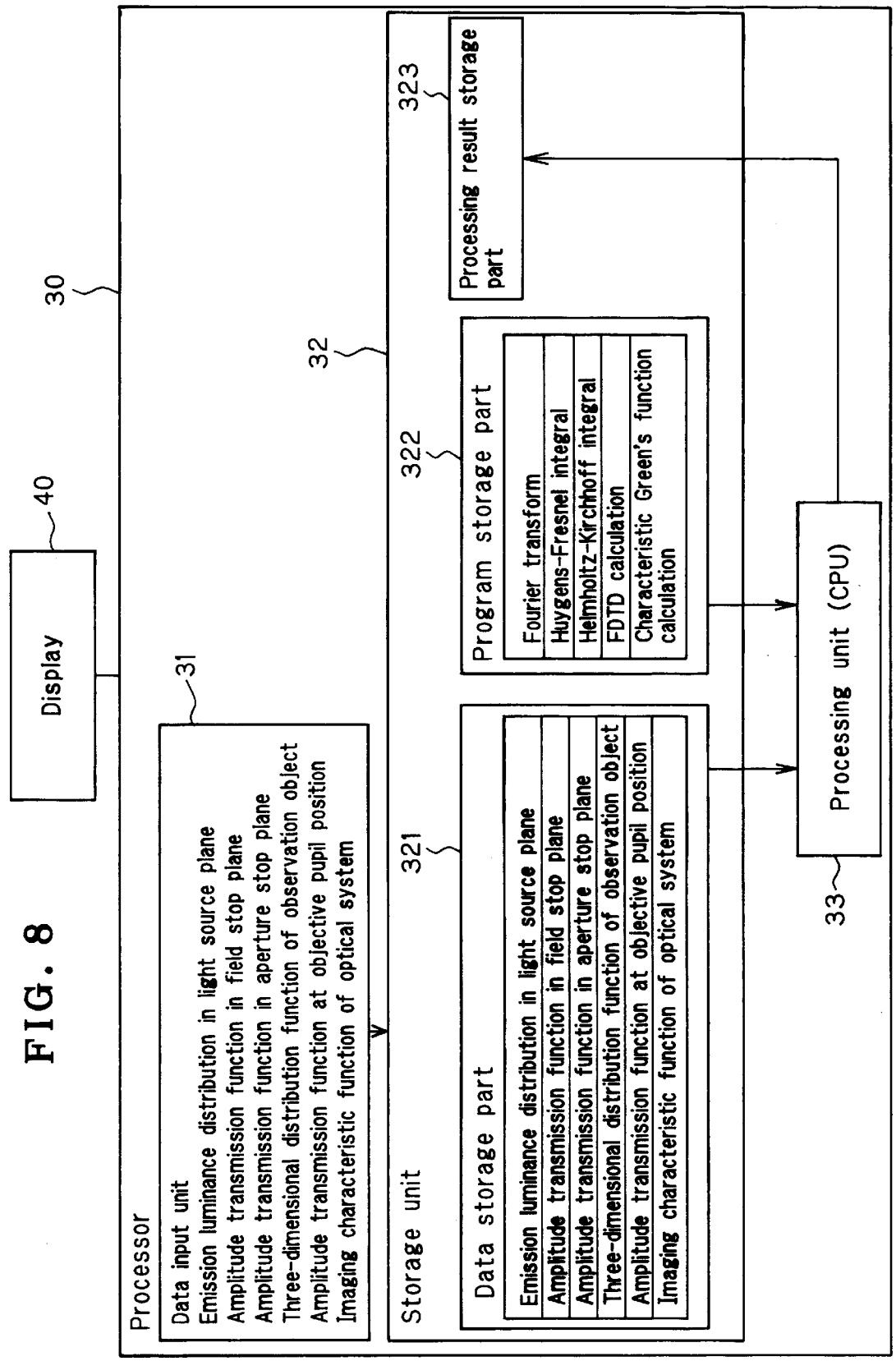
FIG. 8 is a block diagram showing the arrangement of an imaging simulation system according to the present invention.
Figure 9:
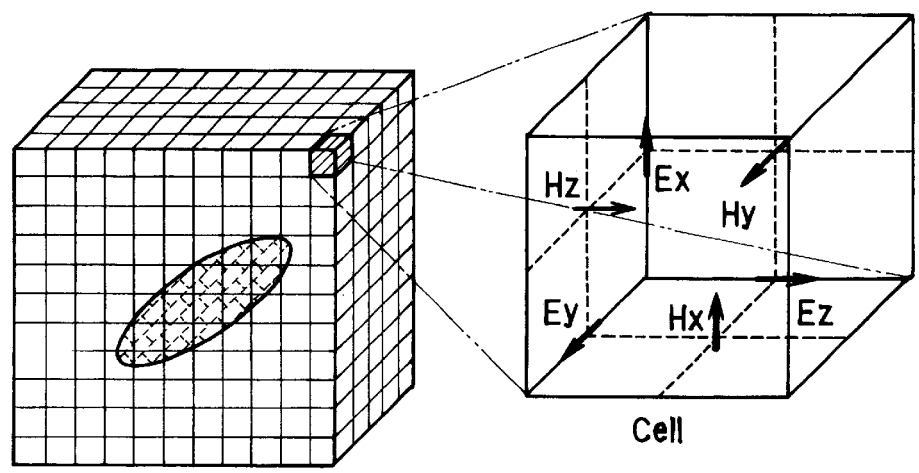
FIG. 9 is a diagram for describing the division of a three-dimensional space in the FDTD method and the elements of an electromagnetic field for each cell.

The arrangement of an imaging simulation system according to the present invention for carrying out the above-described imaging simulation method of the present invention is shown in FIG. 8. The imaging simulation system has a processor 30 and a display 40 as a basic arrangement. The processor 30 includes a data input unit 31 a storage unit 32, and a processing unit 33.

The data input unit 31 has a keyboard for entering data and commands and a reader for reading data stored in an external storage medium, e.g. a floppy disk, to enter various data required to perform simulation.

The storage unit 32 has a data storage part 321 for storing various data entered through the data input unit 31, a program storage part 322 containing programs for executing simulation using various data, and a processing result storage part 323 for storing results of simulation. These storage parts need not be physically independent of each other but may be assigned a storage area for each certain region of the storage unit 32.

When performing a simulation, the processing unit 33 reads necessary data from the data stored in the data storage part 321 and also reads a necessary program from the programs stored in the program storage part 322 and executes processing according to the procedure specified in the flowchart of FIG. 4, for example. Upon completion of all the processing operations, data obtained by the processing is stored in the processing result storage part 323.

The results of the simulation are displayed on the display 40 on the basis of the data stored in the processing result storage part 323, or after image processing or the like has been applied to the data.

In the foregoing, the imaging simulation method according to the present invention has been described on the basis of the principle and embodiments thereof. It should be noted, however, that the present invention is not limited to the foregoing embodiments but can be modified in a variety of ways.

As will be clear from the foregoing description, the use of the imaging simulation method according to the present invention allows accurate imaging simulation to be performed even when the NA of illuminating light is large. Further, the use of the imaging simulation method according to the present invention makes it possible to perform accurate imaging simulation even when the object under observation is not conformable to the 2.5-dimensional configuration. Furthermore, the use of the imaging simulation method according to the present invention allows accurate imaging simulation to be performed even when the image-forming optical system is focused to the inside of the object. In addition, the use of the imaging simulation method according to the present invention makes it possible to simulate imaging in polarization observation.

What we claim is:

1. An imaging simulation method comprising:
a first step of calculating an electric field distribution of illuminating light entering a three-dimensional space containing an observation object;
a second step of calculating an electric field distribution in said three-dimensional space of scattered light generated by interaction between said illuminating light and said observation object; and
a third step of calculating imaging of said scattered light performed by an image-forming optical system by using a Helmholtz-Kirchhoff integral using a characteristic Green's function group of said image-forming optical system.

2. An imaging simulation method according to claim 1, wherein said characteristic Green's function group includes an electric field distribution generated on an observation object side of said image-forming optical system when it is assumed that a point light source is located on an image plane of said image-forming optical system.

3. An imaging simulation method according to claim 2, wherein said characteristic Green's function group is obtained by using a Huygens-Fresnel diffraction integral on a basis of an electric field distribution virtually formed in neighborhood of an image-side pupil position of said image-forming optical system by said point light source.

4. An imaging simulation method according to claim 1, wherein characteristic Green's functions constituting said characteristic Green's function group are in translational relation to each other in the three-dimensional space containing said observation object.

5. An imaging simulation method according to claim 1, wherein, at said third step, said Helmholtz-Kirchhoff integral is calculated over a curved surface crossing an optical axis near a focal position of said image-forming optical system.

6. An imaging simulation method according to claim 1, wherein, at said first step, the electric field distribution of said illuminating light is calculated from a coherent element of an illuminating light source.

7. An imaging simulation method according to claim 6, wherein an intensity of imaging calculated for each coherent element of said illuminating light source is summed up.

8. An imaging simulation method according to claim 7, wherein a method of calculating the electric field distribution of said illuminating light is based on a Huygens-Fresnel diffraction integral of a product of a spatial distribution for each coherent element of said illuminating light source and a pupil function of an illuminating optical system.

9. An imaging simulation method according to claim 7, wherein a method of calculating the electric field distribution of said illuminating light is based on a convolution integral of a spatial distribution for each coherent element of said illuminating light source with a Huygens-Fresnel diffraction integral of a pupil function of an illuminating optical system.

10. An imaging simulation method according to claim 6, wherein the electric field distribution of said illuminating light is calculated on a basis of a convolution integral of a spatial emission distribution of a laser light source with a Huygens-Fresnel diffraction integral of a pupil function of an illuminating optical system.

11. An imaging simulation system comprising a processor having a data input unit and a processing unit, said processor including:
a first step of calculating an electric field distribution of illuminating light entering a three-dimensional space containing an observation object;
a second step of calculating an electric field distribution in said three-dimensional space of scattered light generated by interaction between said illuminating light and said observation object; and a third step of calculating imaging of said scattered light performed by an image-forming optical system by using a Helmholtz-Kirchhoff integral using a characteristic Green's function group of said image-forming optical system.

12. An imaging simulation system according to claim 11, wherein said characteristic Green's function group includes an electric field distribution generated on an observation object side of said image-forming optical system when it is assumed that a point light source is located on an image plane of said image-forming optical system.

13. An imaging simulation system according to claim 12, wherein said characteristic Green's function group is obtained by using a Huygens-Fresnel diffraction integral on a basis of an electric field distribution virtually formed in neighborhood of an image-side pupil position of said image-forming optical system by said point source.

14. An imaging simulation system according to claim 11, wherein characteristic Green's functions constituting said characteristic Green's function group are in translational relation to each other in the three-dimensional space containing said observation object.

15. An imaging simulation system according to claim 11, wherein, at said third step, said Helmholtz-Kirchhoff integral is calculated over a curved surface crossing an optical axis near a focal position of said image-forming optical system.

16. An imaging simulation system according to claim 11, wherein, at said first step, the electric field distribution of said illuminating light is calculated from a coherent element of an illuminating light source.

17. An imaging simulation system according to claim 16, wherein a method of calculating the electric field distribution of said illuminating light is to sum up an intensity of imaging calculated on a basis of a Huygens-Fresnel diffraction integral of a product of a spatial distribution for each coherent element of said illuminating light source and a pupil function of an illuminating optical system.

18. An imaging simulation system according to claim 16, wherein a method of calculating the electric field distribution of said illuminating light is to sum up an intensity of imaging calculated on a basis of a convolution integral of a spatial distribution for each coherent element of said illuminating light source with a Huygens-Fresnel diffraction integral of a pupil function of an illuminating optical system.

19. An imaging simulation system according to claim 16, wherein the electric field distribution of said illuminating light is calculated on a basis of a convolution integral of a spatial emission distribution of a laser light source with a Huygens-Fresnel diffraction integral of a pupil function of an illuminating optical system.

20. A recording medium containing an imaging simulation program for instructing a computer to execute:

a first step of calculating an electric field distribution of illuminating light entering a three-dimensional space containing an observation object;

a second step of calculating an electric field distribution in said three-dimensional space of scattered light generated by interaction between said illuminating light and said observation object; and a third step of calculating imaging of said scattered light performed by an image-forming optical system by using a Helmholtz-Kirchhoff integral using a characteristic Green's function group of said image-forming optical system.

* * * * *